Figure 1:
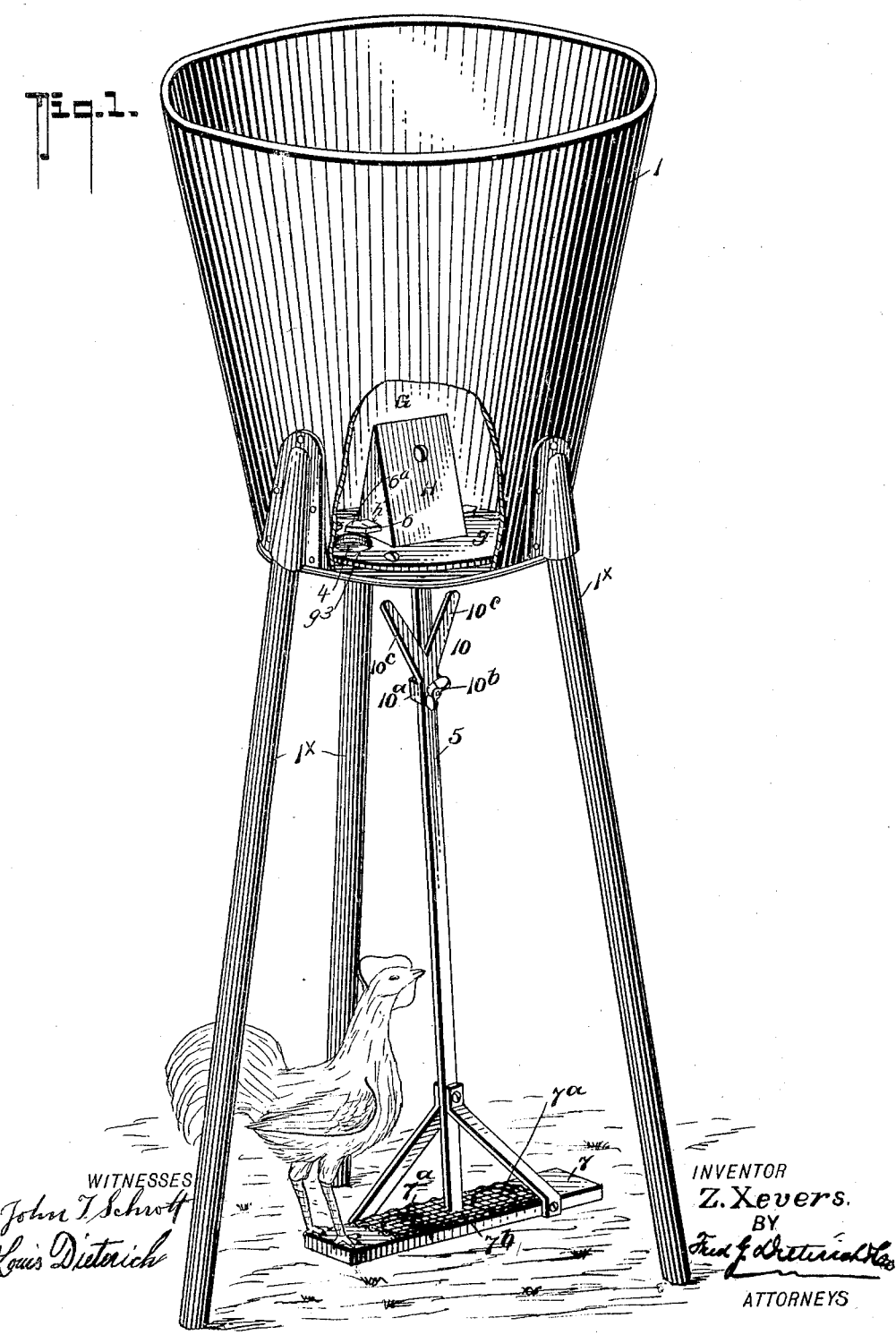

No. 756,765. PATENTED APR. 5, 1904.
Z. XEVERS.
AUTOMATIC FEEDING DEVICE AND FIXTURES.
APPLICATION FILED MAR. 18, 1903.
NO MODEL. 2 SHEETS—SHEET 1.

WITNESSES
John T. Schroff
Louis Dieterich

INVENTOR
Z. Xevers.
BY
Fred G. Dieterich & Co.
ATTORNEYS

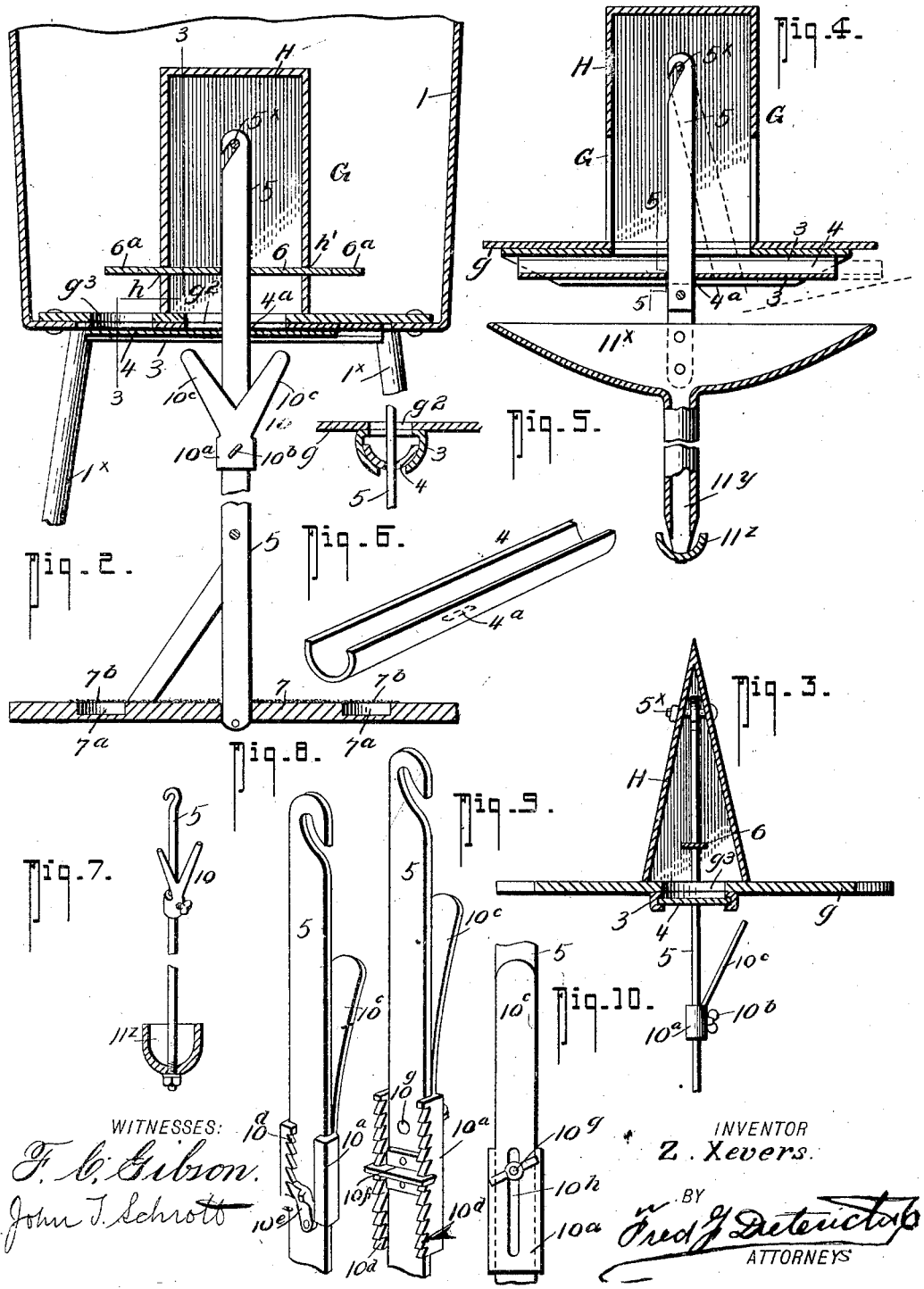

No. 756,765. Patented April 5, 1904.

UNITED STATES PATENT OFFICE.

ZACHARIAH XEVERS, OF SANTA CRUZ, CALIFORNIA.

AUTOMATIC FEEDING DEVICE AND FIXTURES.

SPECIFICATION forming part of Letters Patent No. 756,765, dated April 5, 1904.

Application filed March 18, 1903. Serial No. 148,386. (No model.)

*To all whom it may concern:*

Be it known that I, ZACHARIAH XEVERS, a citizen of the United States, residing at Santa Cruz, in the county of Santa Cruz and State of California, have invented a new and Improved Automatic Feeding Device and Fixtures for Feeding Horses, Hogs, Rabbits, Chickens, Geese, Turkeys, Ducks, Pigeons, and the Like, of which the following is a specification.

This invention primarily seeks to provide a simple, effective, and easy-operating device whereby a definite and predetermined supply of grain can be fed to horses, cattle, turkeys, chickens, &c.; and the invention proper seeks to provide a device of this character capable of being operated by the different animals which are intended being fed.

My invention in its generic sense embodies a receptacle or hopper into which the grain is placed and a gate mechanism attached to the receptacle or hopper to allow the grain to pass from the hopper at predetermined times and in predetermined quantities, said gate being operated by the animal desiring to be fed.

In its complete make-up the invention embodies certain novel construction of parts, which will be described in detail and then specifically pointed out in the appended claims, reference being had to the accompanying drawings, in which—

Figure 1 is a perspective view showing my invention as applied for use as poultry-feeding device, parts being broken away. Fig. 2 is a vertical longitudinal section thereof. Fig. 3 is a cross-section taken practically on the line 3 3 of Fig. 2. Fig. 4 is a detail vertical longitudinal section of a slightly-modified form of my invention. Fig. 5 is a detail cross-section on the line 5 5 of Fig. 4. Fig. 6 is a detail view of the gate shown in Fig. 4. Fig. 7 is a perspective view of a slightly-modified form of the swing-rod and bait-cup hereinafter referred to, and Figs. 8, 9, and 10 are detail views of the modified forms of the regulator devices hereinafter referred to.

Reference being had to the accompanying drawings, in which like numerals and letters of reference indicate like parts in all of the figures, 1 designates a receptacle or hopper mounted upon suitable legs $1^x$, which may be of any approved form, shape, or style desired. In Fig. 1 I have shown a receptacle or hopper as being in the nature of a bucket. However, the nature and style of receptacle may be varied without departing from the scope of my invention.

Referring now more particularly to Figs. 1, 2, and 3, inclusive, it will be seen that I provide a gate mechanism (designated generally by G) consisting of a base-plate $g$, adapted to be bolted or otherwise secured over a suitable opening in the bottom of the grain-holding receptacle and upon which is fixedly mounted a hood, $\Lambda$-shaped in vertical cross-section, and said hood in the form shown in Figs. 1, 2, and 3 is closed at the ends. $g^2$ designates a slotway in the base $g$, for a purpose presently to appear. Upon the under side of the base-plate is mounted to slide in suitable guides 3 the gate 4, having an aperture $4^a$, through which is adapted to pass what I term the "swing" rod or bar 5, which passes up through the slotway $g^2$ in the base-plate $g$ and is fulcrumed within the hood upon the bolt $5^x$, passing through the hood and the end of the swing rod or bar 5, whereby the said bar 5 is adapted to swing upon the bolt $5^x$ and operate the gate 4, as will presently appear.

In the form shown in Figs. 1, 2, and 3 the hood H is entirely closed at the ends, and the grain is discharged through a supplemental opening $g^3$ in the base-plate $g'$, which opening is closed by the gate 4, slidable in the guideway 3, and in this form the gate 4 is in the nature of a flat member which serves to close the opening $g^2$ at all times and normally close the discharge-opening $g^3$. Loosely mounted upon the swing rod or bar 5 within the hood H and projected through the elongated apertures $h\,h$ in the end face of the hood H is what I term an "agitator" 6, having V-shaped ends $6^a\,6^a$, as shown in Figs. 1 and 2. Upon the lower end of the swing rod or bar 5 is mounted a bait-holding receptacle, which may be in the nature of the elongated member 7, having bait-holding pockets $7^a\,7^a$, covered by a wire screen $7^b$ for the receipt of grain or other suitable bait, or it may be in the nature of a cup-shaped device, as shown in Fig. 7.

I have shown a slightly-modified form of my invention in Figs. 4, 5, and 6, by reference to which it will be seen the opening or slotway $g^2$ is closed by the gate 4, which consists of the semicylindrical member. (Shown in detail in Fig. 6.)

In the form shown in Fig. 4 no agitator is necessary, since the swing rod or bar 5 serves to sufficiently agitate the grain to prevent bridging and clogging the opening $g^2$.

In the form shown in Figs. 1, 2, and 3 by constructing the agitator so as to move with the swing rod or bar 5 the grain within the receptacle will be prevented from bridging the discharge-opening $g^3$, and thereby assuring a positive feed of the grain through the opening as the gate is reciprocated. 10 designates a suitable regulator, which in the preferred construction consists of the body portion $10^a$, adapted to take around the swing-rod 5, and the said regulator is held in its adjusted position by a thumb-screw $10^b$. Formed integral with the body portion $10^a$ of the regulator 10 and projected upwardly and divergingly are two arms $10^c$ $10^c$, which as the bar swings out of its vertical position in a pendulum movement alternately engage the under side of the plate $g$, and thereby regulate the swing of the bar 5 to allow the gate being reciprocated to a greater or lesser extent, as desired.

In Fig. 8 I have shown a slightly-modified form of regulator, in which the body portion $10^a$ is formed with a rack portion $10^d$, with which engages a catch $10^e$, pivotally fastened to the bar 5.

In Figs. 9 and 10 I have illustrated a further modification of regulator device in which the body portion $10^a$ is formed with a double rack $10^d$, with which engages a catch member $10^f$, rigidly fastened to the bar 5, and the body portion 10 has in its front face a slotway $10^h$, through which and the bar 5 is adapted to pass a bolt $10^g$, fastened with a thumb-screw to hold the regulator to its adjusted position. In the form shown in Figs. 8. 9, and 10 I dispense with one of the arms $10^c$.

When applied to cattle and hog feeders, I may, to direct the grain to the place desired as it leaves the hopper, provide a suitable chute, (not shown,) and while I prefer to use a chute, yet I desire it understood that the same may be entirely dispensed with, or I may provide a swing-bar consisting of a flat portion to which is fastened a tubular member $11^y$, having a pan $11^x$ at its upper end and a bait-holding cup $11^z$ at its lower end. The pan $11^x$ serves to catch the grain and discharge it into the cup $11^x$, from which it will overflow and be deposited upon the ground or into any suitable receptacle which may be provided therefor.

So far as described the operation of my invention as applied to poultry-feeders is best explained as follows: Referring now more particularly to Figs. 1, 2, and 3, it will be seen that as the fowl or animal attempts to get the bait in the bait-holding receptacle 7 it will cause the rod 3 to leave its vertical position, carrying with it the gate 4, causing it to discharge the grain broadcast. As soon as the fowl or animal leaves the bait-receptacle 7 the rod 5 will again return to its vertical position, carrying with it the gate, and thereby stopping the discharge of the grain. By adjusting the regulator up or down upon the rod 3 the extent to which the grain is discharged can be regulated at will.

In Fig. 4 I have shown the cup-shaped receptacle $11^x$ and the discharge-tube $11^y$ with its bait-cup $11^z$, and while I may use this form of my invention in connection with stock and poultry feeding mechanism in general, yet it is more especially adapted for use when the invention is used for feeding hogs, geese, ducks, rabbits, and the like. The animal desiring to be fed will endeavor to get the bait out of the cup $11^x$ and in so doing will cause the swing-rod to leave its vertical position, as aforementioned, reciprocating the gate 4 and allowing the grain to fall into the receptacle $11^x$ and from thence to the bait-cup $11^z$, overflowing said bait-cup and falling to the ground or into any desired receptacle.

While I have described the different forms of feeding mechanisms shown in the drawings as adapted for use for specific purposes, yet I desire it understood that the different forms may be used interchangeably, if desired; neither do I limit myself to the exact structure set out in the specification and shown in the drawings, since it is obvious that slight changes in the arrangement of parts may be made without departing from the scope of the appended claims.

Having thus described my invention, what I claim, and desire to secure by Letters Patent, is—

1. In a device as described, a grain-receiving member having an opening in the bottom thereof, a plate adapted to be fastened over said opening said plate having a discharge-aperture, a gate having an aperture for controlling said discharge-aperture, a hood mounted upon said plate within the grain-receiving member, a swing-lever fulcrumed within said hood and passing downward through the aperture in said gate member for the purposes specified.

2. In a device as described, a grain-receiving member, having an opening in the bottom thereof, a plate adapted to be fastened over said opening said plate having a discharge-aperture, a gate having an aperture for controlling said discharge-aperture, a hood mounted upon said plate within the grain-receiving member, a swing-lever fulcrumed within said hood and passing downward through the aperture in said gate member, an agitator mounted upon the swing-rod above the gate, for the purposes specified.

3. In a device as described, a grain-receiving member, having an opening in the bottom thereof, a plate adapted to be fastened over said opening said plate having a discharge-aperture, a gate having an aperture for controlling said discharge-aperture, a hood mounted upon said plate within the grain-receiving member, a swing-lever fulcrumed within said hood and passing downward through the aperture in said gate member, a regulator mounted upon said swing-rod below the gate for controlling the movement of the swing-rod substantially as shown and described.

4. In a device as described, a grain-receiving member having an opening in the bottom thereof, and plate adapted to be fastened over said opening said plate having a discharge-aperture, a gate having an aperture for controlling said discharge-aperture, a hood mounted upon said plate within the grain-receiving member, a swing-rod fulcrumed within said hood and passing downward through the aperture in said gate member, a regulator mounted upon said swing-rod below the gate for controlling the movement of the swing-rod, an agitator mounted upon said rod above the gate as shown and for the purposes described.

5. In a feeding device as described, a food-receiving hopper having a discharge-opening, gate devices for controlling said discharge-opening, said gate devices including a swing-rod, a regulator adjustably mounted upon said swing-rod as and for the purposes described.

6. In a feeding device as described, a food-receiving hopper having a discharge-opening, gate devices for controlling said discharge-opening, said gate devices including a swing-rod, a regulator adjustably mounted upon said swing-rod, said regulator including a projecting arm, adapted to engage the under side of the gate devices as the swing-rod moves from its vertical position for the purposes specified.

7. In a feeding device as described, a grain-holding receptacle having an opening in the bottom thereof, a plate adapted to be fastened over said opening, said plate having a discharge-opening and an elongated aperture, a hood over said aperture, a swing rod or lever fulcrumed within the hood and passing through said elongated aperture, a gate controlled by said swing-lever for closing the discharge-opening substantially as and for the purposes specified.

8. In a feeding device as described, a grain-holding receptacle having an opening in the bottom thereof, a plate adapted to be fastened over said opening, said plate having a discharge-opening and an elongated aperture, a hood over said aperture, a swing rod or lever fulcrumed within the hood and passing through said elongated aperture, a gate controlled by said swing-lever for closing the discharge-opening, an agitator mounted upon the swing-rod above the plate whereby the grain is prevented from bridging the discharge-opening, substantially as and for the purposes described.

9. In a feeding device as described, a grain-holding receptacle having an opening in the bottom thereof, a plate adapted to be fastened over said opening, said plate having a discharge-opening and an elongated aperture, a hood over said aperture, a swing rod or lever fulcrumed within the hood and passing through said elongated aperture, a gate controlled by said swing-lever for closing the discharge-opening, an agitator mounted within the hood upon the swing-rod said agitator projecting through the end walls of the hood and over the discharge-opening whereby the grain will be prevented from bridging the discharge-opening for the purposes described.

10. The combination with the grain-receiver having an opening therein, of the gate held to normally close said opening, said gate having an aperture, said grain-receiver having a second opening therein, a closed hood mounted over said second opening, and within the grain-receiver, a rod or bar pendent through said second opening and said aperture in the gate, said rod being fulcrumed at its upper end within the hood, and carrying at its lower end a bait-receiver, a regulator adjustably mounted upon said rod or bar below the gate to regulate the swing of said bar, and an agitator mounted upon said bar within the grain-receiver all being so arranged that the swing movement of the bar will operate the gate and agitator to permit of the discharge of grain.

11. A discharge mechanism for feeding devices, comprising a base-plate having a discharge-opening therein, a hood mounted upon one side of said base-plate, a guideway fixedly secured upon the other side of said base-plate, a gate adapted to slide in said guideway, an agitator having an aperture and being mounted upon said hood, a rod or bar pendently mounted within the aforesaid hood, and projecting downward through the aperture in the agitator and base-plate, a regulator mounted upon said rod below the gate, a bait-holder secured to the lower end of said bar or rod, said bait-holder including a bait-receiving portion, all being arranged in a manner whereby the bar will receive a pendulum movement by the efforts of the fowl or animal to get the bait.

12. The discharge mechanism for feeding devices, comprising a base portion $g$ having a discharge-opening $g^3$ therein, a hood H mounted upon the upper side of the said base portion, a guideway $4^a$ fixedly secured upon the under side of said base-plate $g$, a gate 4 adapted to slide in said guideway and close said discharge-opening $g^3$, an agitator 6 mounted upon said hood H, a rod or bar 5 pivotally secured within the hood H, and projecting downwardly through the apertures in the agitator 6 base-plate $g$ and gate 4, said agitator being adapted for reciprocating motion in a horizontal plane, a regulator 10 mounted upon said rod 5 below the gate 4 and base-plate $g$, the bait-holder 7 secured to the lower end of said bar or rod 5, said bait-holder including a bait-receiving portion, all being arranged in a manner whereby the bar or rod will receive a pendent movement by the efforts of the fowl or animal desiring to be fed.

13. In a device of the character described, an apertured base-plate including an elongated aperture, a hood mounted upon the base-plate over the elongated aperture, a swing-rod fulcrumed within the hood and passing through the elongated aperture, in the base-plate, and a gate, controlled by the movement of the swing-rod, substantially as shown and described.

ZACHARIAH XEVERS.

Witnesses:
ANDREW FULL,
FRED. WALTERS.